(12) United States Patent
Wang et al.

(10) Patent No.: US 7,995,241 B2
(45) Date of Patent: Aug. 9, 2011

(54) METHOD OF CAPTURING IMAGE OF DOCUMENT WITH ALIGNMENT OF DOCUMENT FIXER AND IMAGE PICKUP DEVICE

(75) Inventors: Ching-Chung Wang, Taipei (TW); Chen-Ning Hsi, Taipei (TW)

(73) Assignee: Primax Electronics Ltd., Taipei (TW)

( * ) Notice: Subject to any disclaimer, the term of this patent is extended or adjusted under 35 U.S.C. 154(b) by 555 days.

(21) Appl. No.: 12/251,577

(22) Filed: Oct. 15, 2008

(65) Prior Publication Data

US 2010/0046016 A1 Feb. 25, 2010

(30) Foreign Application Priority Data

Aug. 22, 2008 (TW) .............................. 97132039 A

(51) Int. Cl.
*H04N 1/387* (2006.01)
*H04N 1/10* (2006.01)
*G06K 9/32* (2006.01)
*G06T 5/50* (2006.01)
*G06T 7/60* (2006.01)

(52) U.S. Cl. ......... 358/1.9; 358/449; 358/450; 358/474; 358/479; 358/488; 382/284; 382/287; 382/291; 382/294

(58) Field of Classification Search ................... 358/1.9, 358/1.18, 449, 450, 471, 474, 479, 488, 494, 358/453; 382/282, 284, 286, 287, 291, 294
See application file for complete search history.

(56) References Cited

U.S. PATENT DOCUMENTS

2008/0151331 A1* 6/2008 Osakabe ...................... 358/498
2009/0268260 A1* 10/2009 Ohira et al. .................. 358/474
* cited by examiner

*Primary Examiner* — Scott A Rogers
(74) *Attorney, Agent, or Firm* — Kirton & McConkie; Evan R. Witt

(57) ABSTRACT

A method of capturing an image of a document is provided. First, a notebook computer having a base is provided, wherein an image pickup device is disposed on the notebook computer, and a symbol mark is formed on the base of the notebook computer. Next, a document fixer having a fixer middle mark is provided. The document is fixed by the document fixer, wherein a centerline of a long edge of the document is aligned with the fixer middle mark. Next, the document fixer is moved according to a size of the document until the fixer middle mark is aligned with the symbol mark. After the image of the document is captured, an image processing procedure is performed. By aligning the fixer middle mark with the symbol mark of the notebook computer, the document is precisely positioned and thus a sharp image with no tilted distortion is acquired.

32 Claims, 10 Drawing Sheets

US 7,995,241 B2

METHOD OF CAPTURING IMAGE OF DOCUMENT WITH ALIGNMENT OF DOCUMENT FIXER AND IMAGE PICKUP DEVICE

FIELD OF THE INVENTION

The present invention relates to a method of capturing an image of a document, and more particularly to a method of capturing an image of a document by using an image pickup device.

BACKGROUND OF THE INVENTION

Image pickup devices are usually used to take photographs or record video data. In addition, image pickup devices are applied to web cameras for holding a video conference. Recently, the commercially available notebook computer is usually equipped with a built-in image pickup device.

With increasing development of digital techniques, text documents are gradually created as electronic files. Generally, text documents are scanned by scanning apparatuses and then saved as electronic files such as PDF (Portable Document Format) files. In a case that no scanning apparatus is communicated with the notebook computer, the images of simple documents such as single-sided papers or business cards may be captured by the built-in image pickup device. The images captured by the built-in image pickup device are usually saved as JPEG (Joint Photographic Experts Group) files. Most users prefer using scanning apparatuses to scan the text documents as PDF files because the texts and signs contained in the PDF files are readable by the computer systems and may be converted as editable text files.

As known, optical character recognition (OCR) is a process of capturing an image of a document and then extracting the texts from that image. It is possible to analyze images that are captured from the image pickup device according to the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

Take a notebook computer having an image pickup device for example. The image pickup device is usually arranged on an upper cover of the notebook computer. After the document is placed on a proper location of a working plane (e.g. a desk plane), the upper cover of the notebook computer is rotated such that the image pickup device is aligned with or close to the document. Meanwhile, the image of the document may be captured by the image pickup device. When the image pickup device of the notebook computer is used to capture the image of the document placed on the working plane, some drawbacks also occur. The common drawback is occurrence of a distorted image. Since there is no reliable reference point on the document of the working plane, the location of the document on the working plane is readily deviated from the previously adjusted location. Such deviation may cause defocus aberration of the image pickup device during the image capturing process. Under this circumstance, the obtained image is usually blurred. Furthermore, since the shooting range of the image pickup device is insufficient to cover a relatively large-sized document, the image of the large-sized document that is captured by the image pickup device for a single time is usually incomplete. For solving this drawback, the user usually shoots the document for two times in order to obtain two incomplete images. By means of image processing techniques, these two incomplete images are combined together. In other words, after the upper-half portion of the document is captured by the image pickup device, the document should be moved until the lens of the image pickup device is aligned with the lower-half portion of the document and then the image of the lower-half portion is captured. Since there is no reliable reference tool or reference point on the document, the document is readily aslant during movement of the document. The aslant document usually fails to be parallel with or located at the original location of the document. Under this circumstance, the image of the lower-half portion of the document is distorted and is unsuccessfully combined with the upper-half portion of the document. For obtaining a sharp image, it is necessary to re-shoot the document. In other words, it is troublesome for the user to correct the distorted image.

Therefore, there is a need of providing a method of capturing a sharp and non-distorted image so as to obviate the drawbacks encountered from the prior art.

SUMMARY OF THE INVENTION

It is an object of the present invention to provide a document fixer for fixing a document, so that a sharp image can be captured by an image pickup device.

Another object of the present invention provides a document fixer capable of smoothly and horizontally moving on a working plane, thereby capturing multiple sub-images of different portions of the document.

A further object of the present invention provides a method of obtaining a complete image of a document by using an image pickup device to capture multiple sub-images of different portions of the document and combining these sub-images together.

In accordance with an aspect of the present invention, there is provided a method of capturing an image of a document by using an image pickup device. First, an image pickup device supporter having a supporter base is provided, wherein the image pickup device is disposed on the image pickup device supporter, and a first symbol mark is formed on a front edge of a supporter base of the image pickup device supporter. Next, a document fixer having a fixer middle mark on the middle thereof is provided. The document is fixed by the document fixer, wherein a centerline of a long edge of the document is aligned with the fixer middle mark. Next, the document fixer is moved according to a size of the document until the fixer middle mark is aligned with the first symbol mark. After the image of the document is captured by the image pickup device, an image processing procedure is performed on the image.

In accordance with an aspect of the present invention, there is provided a method of capturing an image of a document by using an image pickup device. Firstly, an image pickup device supporter having a supporter base is provided, wherein the image pickup device is disposed on the image pickup device supporter. Next, a document fixer is provided and the document is fixed by the document fixer, wherein a fore end of a first portion of the document is aligned with a fore end of the supporter base and a rear end of the first portion of the document is aligned with a rear end of the supporter base. Next, a first sub-image of the first portion of the document by the image pickup device, wherein the first sub-image a first-portion document image area, a first supporter base fore end image area and a first supporter base rear end image area. Next, the document is fixed by the document fixer, but a fore end of a second portion of the document is aligned with the fore end of the supporter base and a rear end of the second portion of the document is aligned with a rear end of the supporter base. Next, a second sub-image of the second portion of the document is captured by the image pickup device, wherein the second sub-image a second-portion document image area, a second supporter base fore end image area and a second supporter base rear end image area. The first and second sub-images are then subject to a trapezoidal correction. Afterwards, by superposing the first supporter base rear end image area of the first sub-image and the second supporter base fore end image area of the second sub-image, the corrected first and second sub-images are combined as a complete image.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a rigid document fixer to fix a flexible document. The document fixer is sustained against an edge of a base of an image pickup device supporter. Since the document is fixed by the document fixer, the document is slightly or no loner aslant during movement of the document.

Figure 1A:
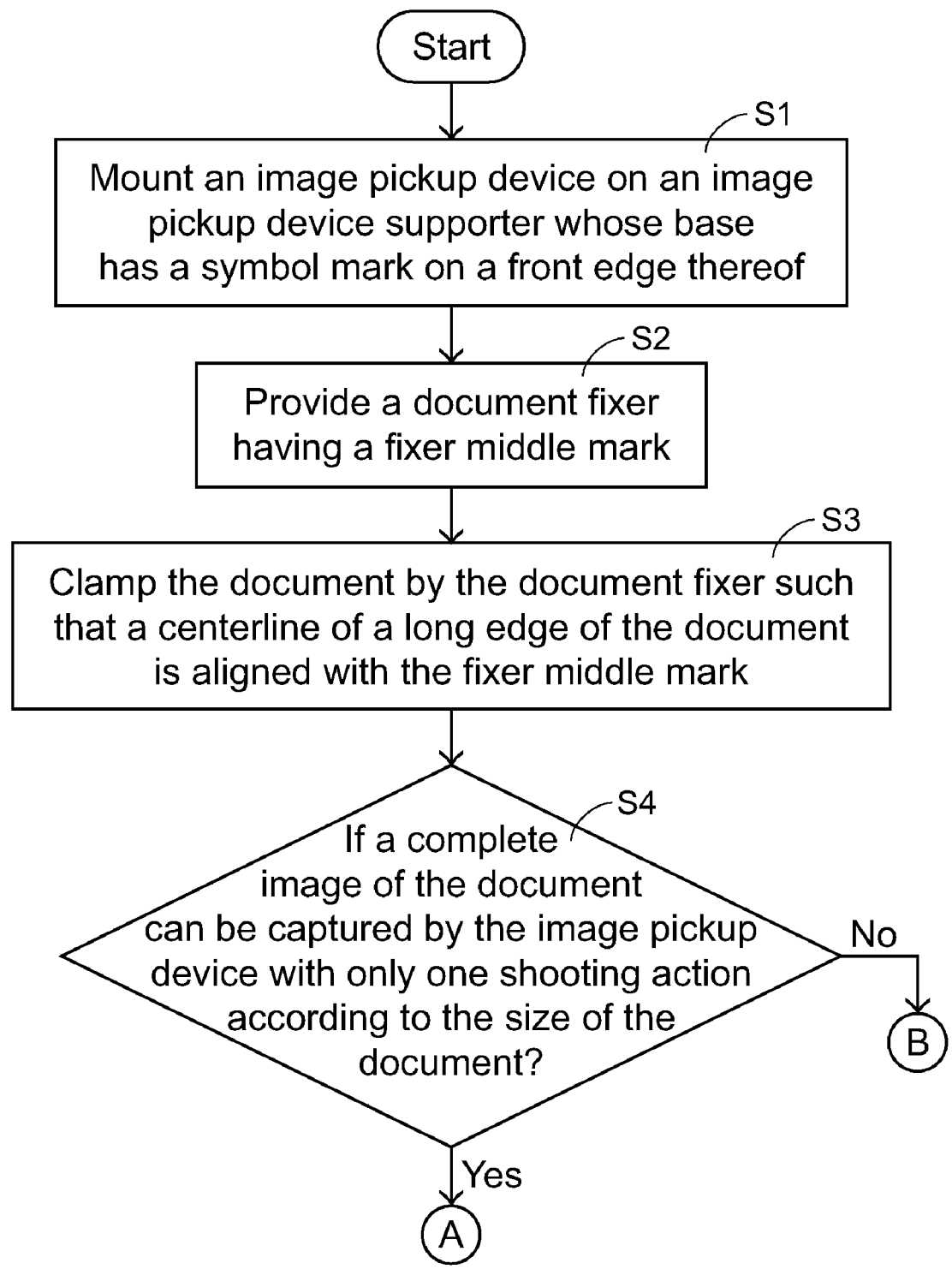
FIGS. 1A and 1B are flowcharts of a method of capturing an image of a document by using an image pickup device according to the present invention.
Figure 1B:
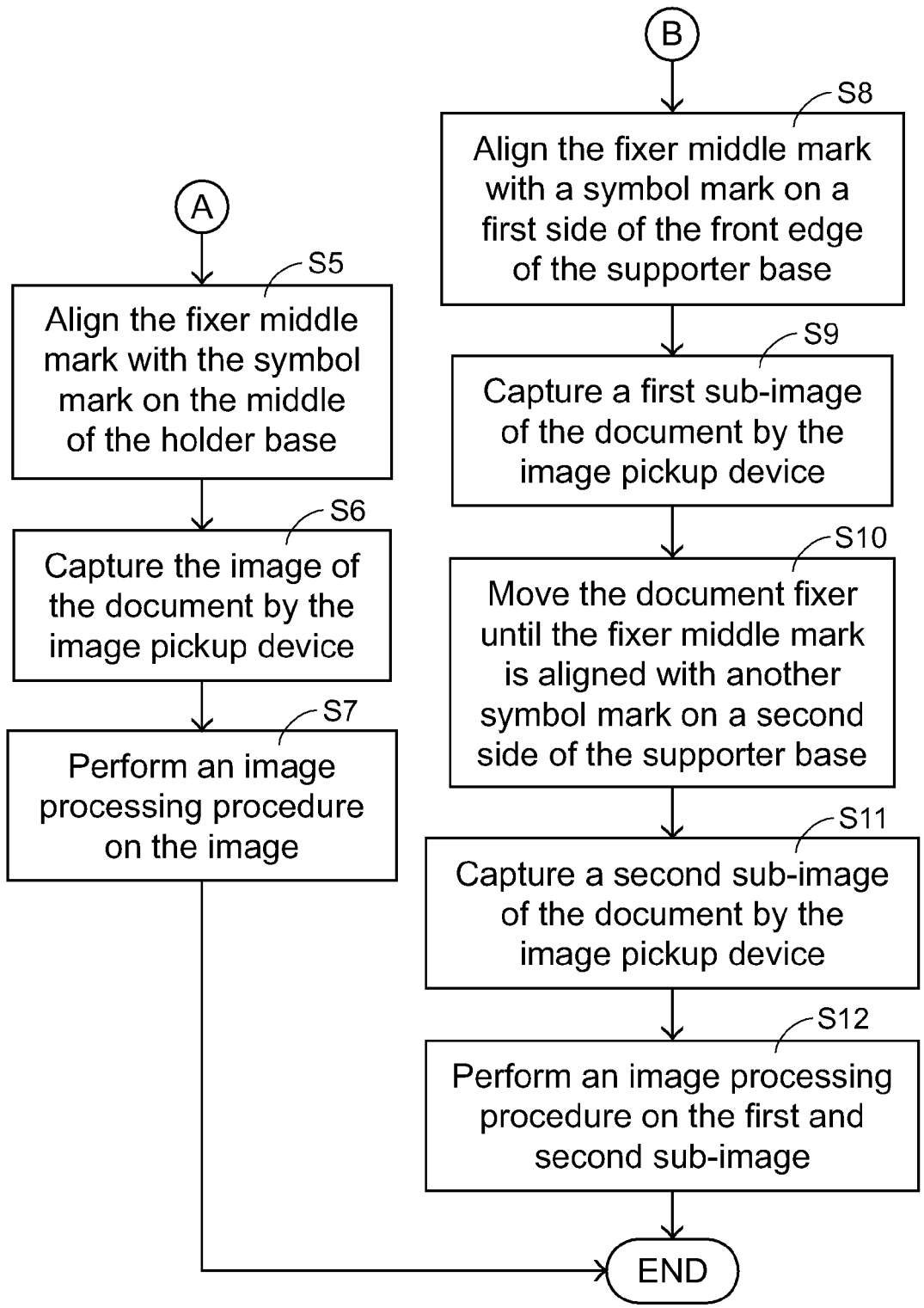

Hereinafter, a method of capturing an image of a document by using an image pickup device according to the present invention will be illustrated with reference to a flowchart of FIGS. 1A and 1B. First of all, an image pickup device is mounted on an image pickup device supporter, wherein a symbol mark is formed on a front edge of the base of the image pickup device supporter (Step S1). Next, a document fixer having a fixer middle mark is provided (Step S2). Next, the document is fixed by the document fixer such that a centerline of a long edge of the document is aligned with the fixer middle mark (Step S3). If a complete image of the document can be captured by the image pickup device with only one shooting action according to the size of the document (Step S4), i.e. the whole document is covered within the shooting range of the image pickup device, the fixer middle mark is aligned with the symbol mark on the middle of the supporter base (Step S5). Next, the image of the document is captured by the image pickup device (Step S6). Next, an image processing procedure is performed on the image of document for correcting the tilted distortion (Step S7). On the other hand, if the whole document is not covered within the horizontal shooting range of the image pickup device (Step S4), the complete document of the document can be captured by the image pickup device with two or more shooting actions. Under this circumstance, the fixer middle mark is aligned with a symbol mark on a first side of the front edge of the supporter base (Step S8). Next, a first sub-image of a first portion of the document is captured by the image pickup device (Step S9). The document fixer is moved until the fixer middle mark is aligned with another symbol mark on a second side of the supporter base (Step S10). Next, a second sub-image of a second portion of the document is captured by the image pickup device (Step S11). Afterward, an image processing procedure is performed on the first and second sub-images of the document for correcting the tilted distortion (Step S12).

Figure 2:
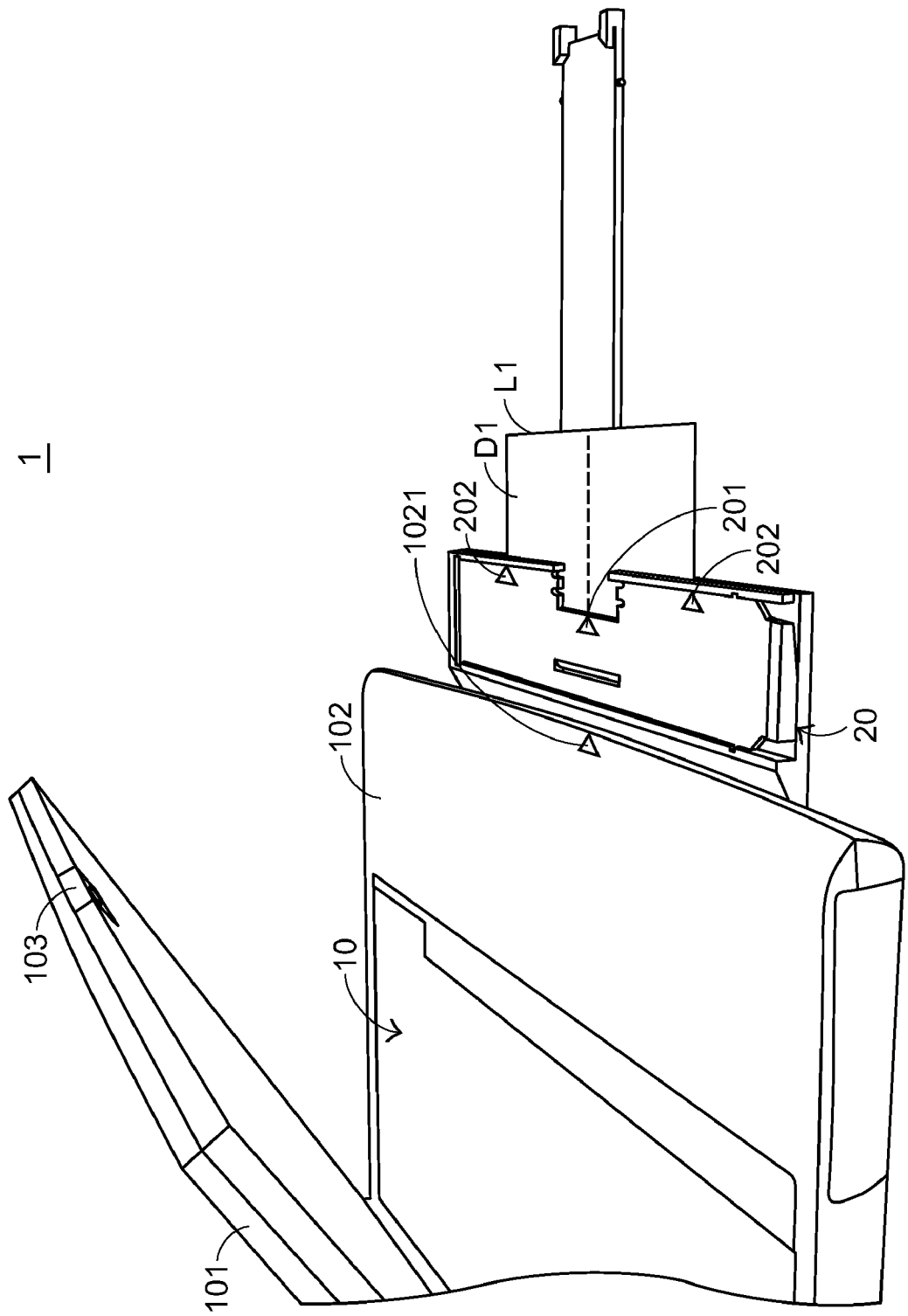
FIG. 2 is a schematic perspective view illustrating an imaging system using an image capturing method according to a first preferred embodiment of the present invention.

FIG. 2 is a schematic perspective view illustrating an imaging system using an image capturing method according to a first preferred embodiment of the present invention. The imaging system 1 principally comprises a notebook computer 10, a document fixer 20 and a document D1. The notebook computer 10 is used as an image pickup device supporter. The base of the image pickup device supporter is the keyboard base of the notebook computer 10. The notebook computer 10 comprises an upper cover 101 and a keyboard base 102. An image pickup device 103 is arranged on a middle and top edge of the upper cover 101. A symbol mark 1021 is formed on the middle of a front edge of the keyboard base 102 (see Step S1 of FIG. 1A). In addition, a fixer middle mark 201 is formed on the middle of the document fixer 20. The document D1 is fixed by the document fixer 20 and the document fixer 20 is sustained against the front edge of the keyboard base 102 of the notebook computer 10. The document D1 has a long side L1. The centerline of the long side L1 of the document D1 is aligned with the fixer middle mark 201 of the document fixer 20 (see Steps S2 and S3 of FIG. 1A). In addition, two lateral symbol marks 202 are formed on bilateral sides of the fixer middle mark 201 of the document fixer 20. The lateral symbol marks 202 are aligned with the short sides of the document D1. As a consequence, the image pickup device 103 will be aligned with the centerline of the document D1.

Figure 3:
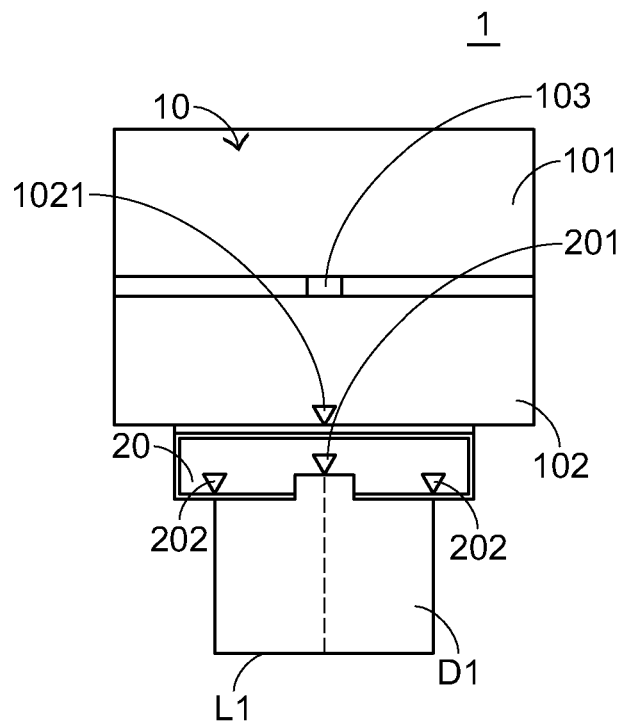
FIG. 3 is a schematic top view of the imaging system as shown in FIG. 2.

FIG. 3 is a schematic top view of the imaging system as shown in FIG. 2. Please refer to FIGS. 2 and 3. In the imaging system 1 of FIG. 3, since the length of the long side L1 of the document D1 is smaller than the length of the document fixer 20, it is discriminated that a complete image of the document D1 can be captured by the image pickup device 103 with only one shooting action (see Step S4 of FIG. 1A). Next, the document fixer 20 is moved until the fixer middle mark 201 of the document fixer 20 is aligned with the first symbol mark 1021 of the keyboard base 102 (see Step S5 of FIG. 1B). At this moment, the lateral symbol marks 202 are also aligned with the short sides of the document D1, so that the image pickup device 103, the first symbol mark 1021 of the keyboard base 102, the fixer middle mark 201 of the document fixer 20 and the centerline of the document D1 are arranged along the same line. Next, the image of the document D1 is captured by the image pickup device 103 (see Step S6 of FIG. 1B). Since the lens of the image pickup device 103 of the notebook computer 10 looks downs at the document D1 at a specified angle, the image of the document D1 is usually distorted as a tilted image. For correcting the tilted image of the document D1, an image processing procedure on the document D1 is necessary (see Step S7 of FIG. 1B). The image processing procedure includes a step of performing a trapezoidal correction on the tilted image in order to compensate the tilted image of the document D1. Since the front edge of the keyboard base 102 and a portion of the document fixer 20 are covered within the shooting range of the image pickup device 103, the image obtained by the trapezoidal correction includes a desired document image area and other undesired image areas. After the undesired image areas are cut off, the desired image of the document D1 is retained.

Figure 4:
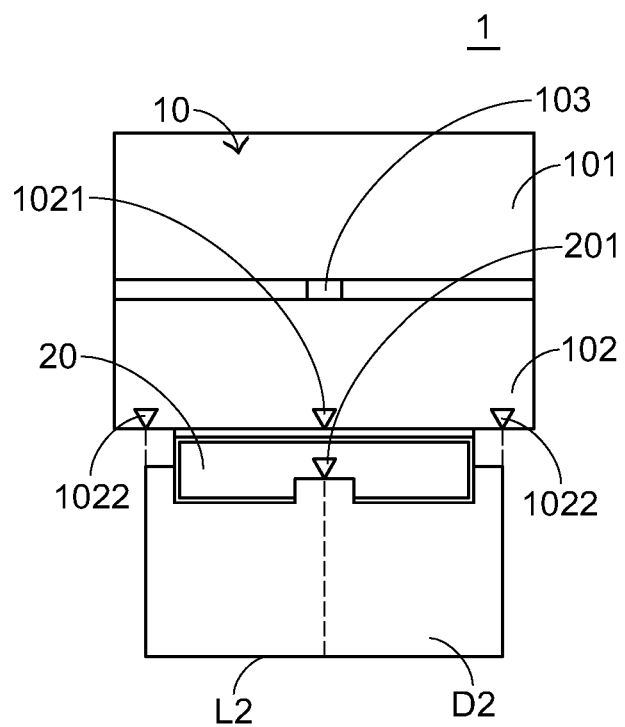
FIG. 4 is a schematic top view of an imaging system using an image capturing method according to a second preferred embodiment of the present invention.

FIG. 4 is a schematic top view of an imaging system using an image capturing method according to a second preferred embodiment of the present invention. As shown in FIG. 4, the notebook computer 10 and the document fixer 20 of the imaging system 1 are also disposed on the working desk. In comparison with FIG. 3, the length of the document D2 shown in FIG. 4 is larger than the length of the document fixer 20 but the length of the long side L2 of the document D2 is smaller than the length of the keyboard base 102. In addition, two second lateral symbol marks 1022 are formed on the front edge of the keyboard base 102 and arranged on bilateral sides of the first symbol mark 1021. The distance between one of the second lateral symbol marks 1022 and the first symbol mark 1021 is the same as the distance between the other of the second lateral symbol marks 1022 and the first symbol mark 1021. In this embodiment, the document D2 is fixed by the document fixer 20, the centerline of the long side L2 of the document D2 is aligned with the fixer middle mark 201 of the document fixer 20, and the fixer middle mark 201 of the document fixer 20 is aligned with the first symbol mark 1021 of the keyboard base 102. At this moment, the lateral symbol marks 1022 are also aligned with the short sides of the document D2. By using these symbol marks 201, 1021 and 1022 as reference points, the image pickup device 103 is aligned with the centerline of the document D2. Next, the image of the document D2 is captured by the image pickup device 103 and corrected by the image processing procedure as described above. After the undesired image areas are cut off, the desired image of the document D2 is retained.

As previously described, if the shooting range of the image pickup device is insufficient to cover a relatively large-sized document, the image of the large-sized document captured by the image pickup device for a single time is usually incomplete. For solving this drawback, the large-sized document needs to be divided into multiple portions. After one portion is shot by the image pickup device for a first time to obtain a first sub-image, the document fixer is moved until a second portion is aligned with the image pickup device. The second portion is shot by the image pickup device for a second time to obtain a second sub-image. The document fixer is successively moved until the remaindering portions are shot by the image pickup device to obtain other sub-images. By means of image processing techniques, these sub-images are combined together so as to acquire a complete image.

Figure 5A:
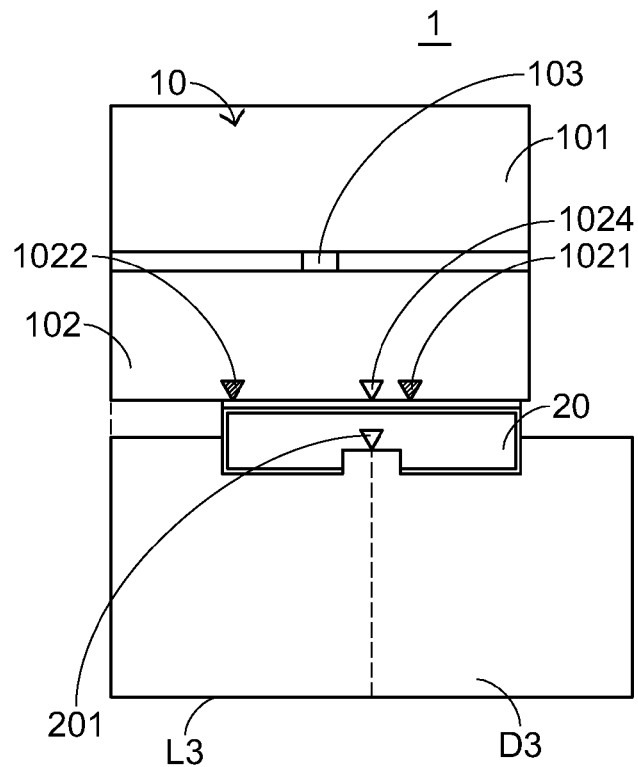
FIGS. 5A, 5B and 5C are schematic top views of an imaging system using an image capturing method according to a third preferred embodiment of the present invention.
Figure 5B:
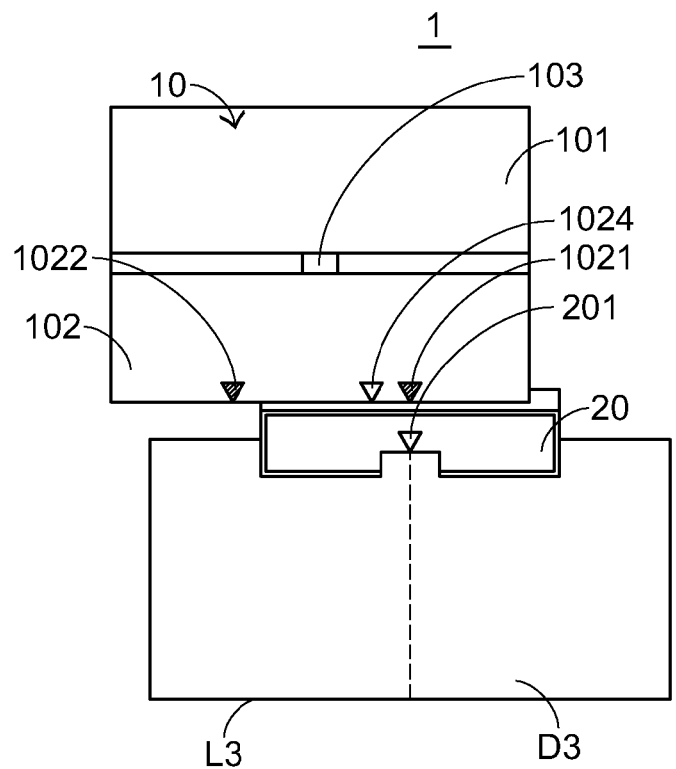
Figure 5C:
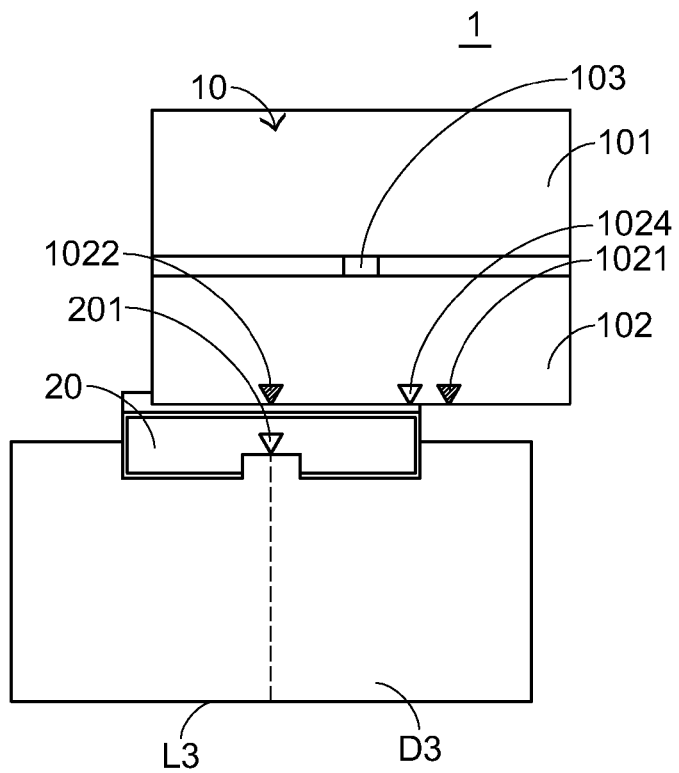

FIGS. 5A, 5B and 5C are schematic top views of an imaging system using an image capturing method according to a third preferred embodiment of the present invention. As shown in FIG. 5, the notebook computer 10 and the document fixer 20 of the imaging system 1 are also disposed on the working desk. In comparison with FIG. 3, the length of the document D3 shown in FIG. 5 is larger than the length of the keyboard base 102. In addition, the first symbol mark 1021 is formed on a side of the front edge of the keyboard base 102, and the second symbol mark 1022 is formed on another side of the front edge of the keyboard base 102. Moreover, a document middle mark 1024 is formed on the front edge of the keyboard base 102. For assuming that the centerline of the long side L3 of the document D3 is aligned with the fixer middle mark 201 before the document D3 is shot, the fixer middle mark 201 needs to be aligned with the document middle mark 1024 and a short side of the document D3 needs to be aligned with a lateral edge of the keyboard base 102, as can be seen in FIG. 5A. Since the length of the document D3 is larger than the length of the keyboard base 102, the image pickup device 103 on the upper cover 101 of the notebook 10 fails to obtain a complete image of the document D3 for a single time. After the document D3 is fixed by the document fixer 20 and the centerline of the long side L3 of the document D3 is aligned with the fixer middle mark 201, the document fixer 20 is moved toward the right side until the fixer middle mark 201 is aligned with the first symbol mark 1021 of the keyboard base 102, as is shown in FIG. 5B. As a consequence, the image pickup device 103 is aligned with the middle of a first portion of the document D3 (see Step S8 of FIG. 1B). Next, the first portion of the document D3 containing the first symbol mark 1021 is shot by the image pickup device 103 for a first time to obtain a first sub-image (see Step S9 of FIG. 1B). The first sub-image includes a first-portion document image area and a first symbol mark image area. After the first sub-image is obtained, a second portion of the document D3 needs to be shot by the image pickup device 103. Next, as shown in FIG. 5C, the document fixer 20 is moved toward the left side such that the fixer middle mark 201 is aligned with the second symbol mark 1022 of the keyboard base 102 while the fixer middle mark 201 is aligned with the centerline of the long side L3 of the document D3. That is, the relative location between the document D3 and the document fixer 20 is maintained unchanged during the document fixer 20 is moved. As a consequence, the image pickup device 103 is aligned with the middle of the second portion of the document D3 (see Step S10 of FIG. 1B). In this embodiment, the distance between the first symbol mark 1021 and the rear end (i.e. the right edge) of the keyboard base 102 is equal to the distance between the second symbol mark 1022 and the fore end (i.e. the left edge) of the keyboard base 102. Next, the second portion of the document D3 containing the second symbol mark 1022 is shot by the image pickup device 102 for a second time to obtain a second sub-image (see Step S11 of FIG. 1B). The second sub-image includes a second-portion document image area and a second symbol mark image area. As previously described, since the lens of the image pickup device 103 of the notebook computer 10 looks downs at the document D3 at a specified angle, the first sub-image and the second sub-image are usually tilted. For correcting the tilted first and second sub-images, the tilted first and second sub-images are subject to an image processing procedure (see Step S12 of FIG. 1B). The image processing procedure includes a step of performing a trapezoidal correction on the tilted first and second sub-images in order to compensate the tilted distortion. Next, by superposing the first symbol mark image area of the first sub-image and the second symbol mark image area of the second sub-image, the corrected first and second sub-images of the document D3 are combined together as a complete image of the document D3. After the undesired image areas are cut off, the desired image of the document D3 is retained.

Figure 6A:
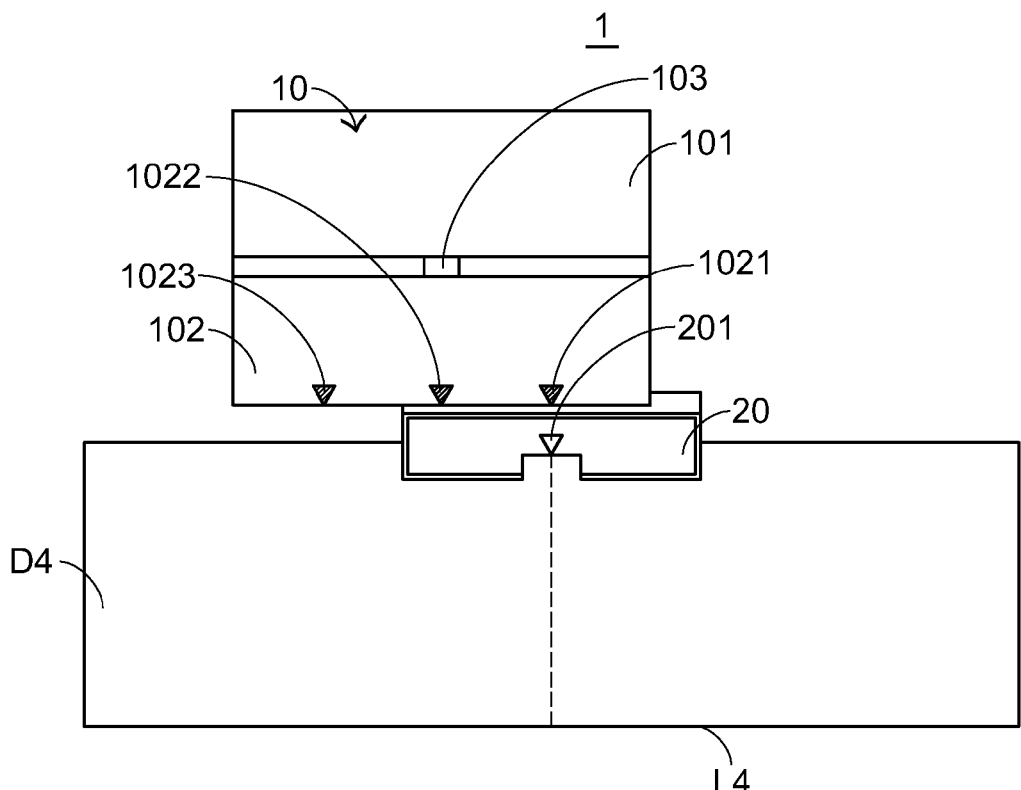
FIGS. 6A, 6B and 6C are schematic top views of an imaging system using an image capturing method according to a fourth preferred embodiment of the present invention.
Figure 6B:
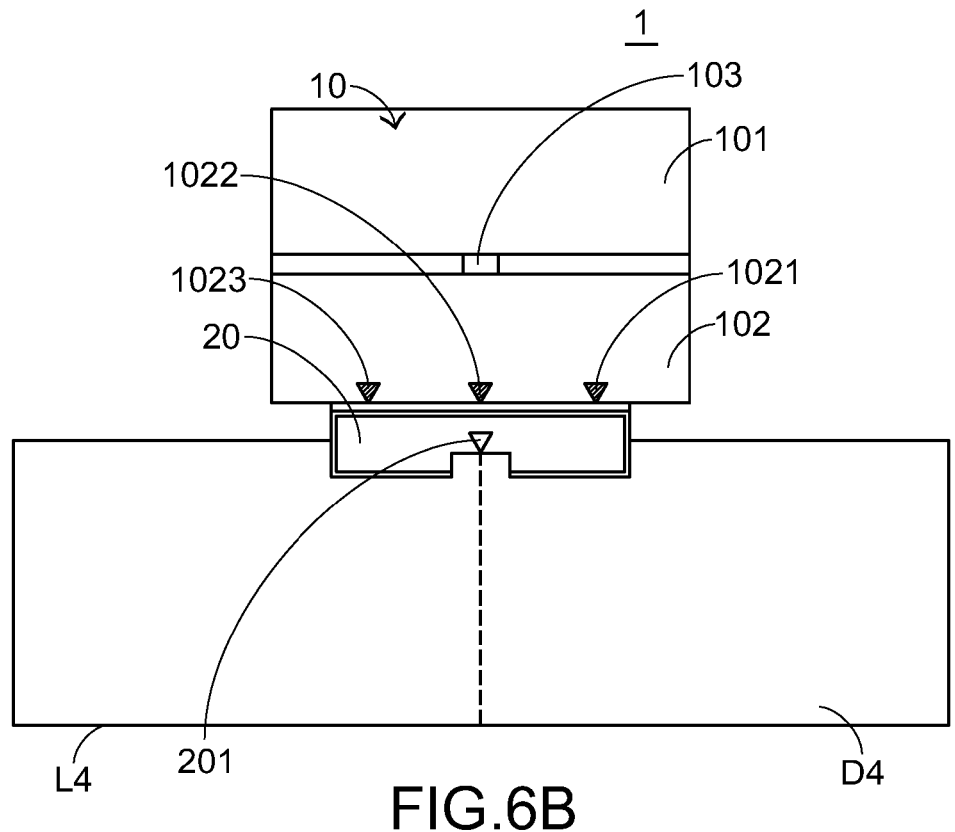
Figure 6C:
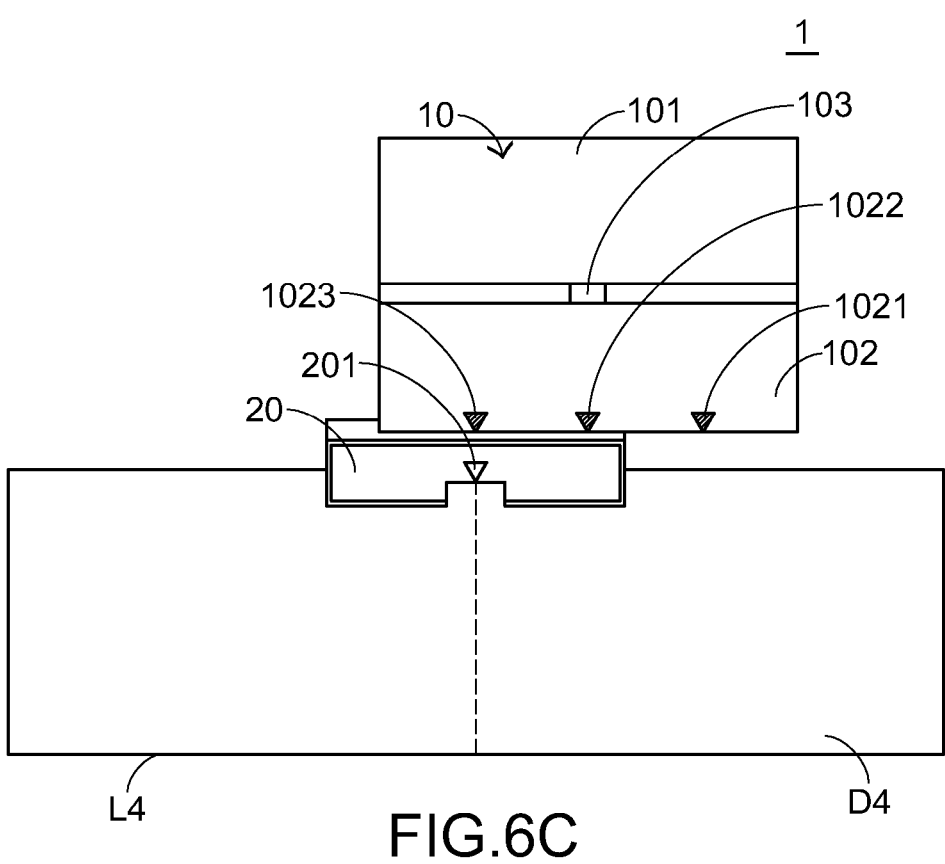

FIGS. 6A, 6B and 6C are schematic top views of an imaging system using an image capturing method according to a fourth preferred embodiment of the present invention. In this embodiment, the document is shot for three times. As shown in FIG. 6, the notebook computer 10 and the document fixer 20 of the imaging system 1 are also disposed on the working desk. A relatively larger-sized document D4 is fixed by the document fixer 20. The length of a long side L4 of the document D4 is also larger than the length of the keyboard base 102. Likewise, the centerline of the long side L4 of the document D4 needs to be aligned with the fixer middle mark 201 before the document D4 is shot by the image pickup device 103. According to the shooting range of the image pickup device 103, the document D4 should be shot for three times in order to acquire the complete image of the document D4. In this embodiment, a first symbol mark 1021, a second symbol mark 1022 and a third symbol mark 1023 are formed on the front edge of the keyboard base 102 from right to left. In other words, the first symbol mark 1021 is formed on the right side of the front edge of the keyboard base 102; the second symbol mark 1022 is formed on the middle of the front edge of the keyboard base 102; and the third symbol mark 1023 is formed on the left side of the front edge of the keyboard base 102. In this embodiment, the distance between the first symbol mark 1021 and the rear end (i.e. the right edge) of the keyboard base 102 is equal to the distance between the third symbol mark 1023 and the fore end (i.e. the left edge) of the keyboard base 102. As shown in FIG. 6A, the document D4 is fixed by the document fixer 20, and the centerline of the long side L3 of the document D3 is aligned with the fixer middle mark 201. The fixer middle mark 201 is aligned with the first symbol mark 1021 such that the image pickup device 103 is aligned with the middle of a first portion of the document D4. Next, the first portion of the document D4 containing the first symbol mark 1021 is shot by the image pickup device 103 for a first time to obtain a first sub-image. The first sub-image includes a first-portion document image area and a first symbol mark image area. After the first sub-image is obtained, a second portion of the document D4 needs to be shot by the image pickup device 103. Next, as shown in FIG. 6B, while the fixer middle mark 201 is aligned with the centerline of the long side L4 of the document D4, the document fixer 20 is moved toward the left side until the fixer middle mark 201 is aligned with the second symbol mark 1022 of the keyboard base 102. As a consequence, the image pickup device 103 is aligned with the middle of the second portion of the document D4. Next, the second portion of the document D4 containing the second symbol mark 1022 is shot by the image pickup device 103 for a second time to obtain a second sub-image. The second sub-image includes a second-portion document image area and a second symbol mark image area. Next, as shown in FIG. 6C, while the fixer middle mark 201 is aligned with the centerline of the long side L4 of the document D4, the document fixer 20 is continuously moved toward the left side until the fixer middle mark 201 is aligned with the third symbol mark 1023 of the keyboard base 102. As a consequence, the image pickup device 103 is aligned with the middle of the third portion of the document D4. Next, the third portion of the document D4 containing the third symbol mark 1023 is shot by the image pickup device 102 for a third time to obtain a third sub-image. The third sub-image includes a third-portion document image area and a third symbol mark image area. Next, the first, second and third sub-images are subject to an image processing procedure. The image processing procedure includes a step of performing a trapezoidal correction on the first and second sub-images in order to compensate the tilted distortion. Next, by superposing the first symbol mark 1021 of the first sub-image and the second symbol mark 1022 of the second sub-image and superposing the second symbol mark 1022 of the second sub-image and the third symbol mark 1023 of the third sub-image, the corrected first, second and third sub-images of the document D4 are combined together as a complete image of the document D4. After the undesired image areas are cut off, the desired image of the document D4 is retained.

In the third and fourth preferred embodiments, the larger-sized document is fixed by the document fixer and the document is moved with the document fixer. By aligning the fixer middle mark with the symbol marks of the keyboard base, the image pickup device is aligned with respective portions of the document so as to capture sub-images of respective portions of the document with multiple shooting actions. These sub-images are combined together as a complete image of the document. Since the images of these symbol marks are also contained in the sub-images of respective portions, these symbol marks can be used as reference points for aligning these sub-images with each other and facilitating combining these sub-images as a complete image.

Figure 7A:
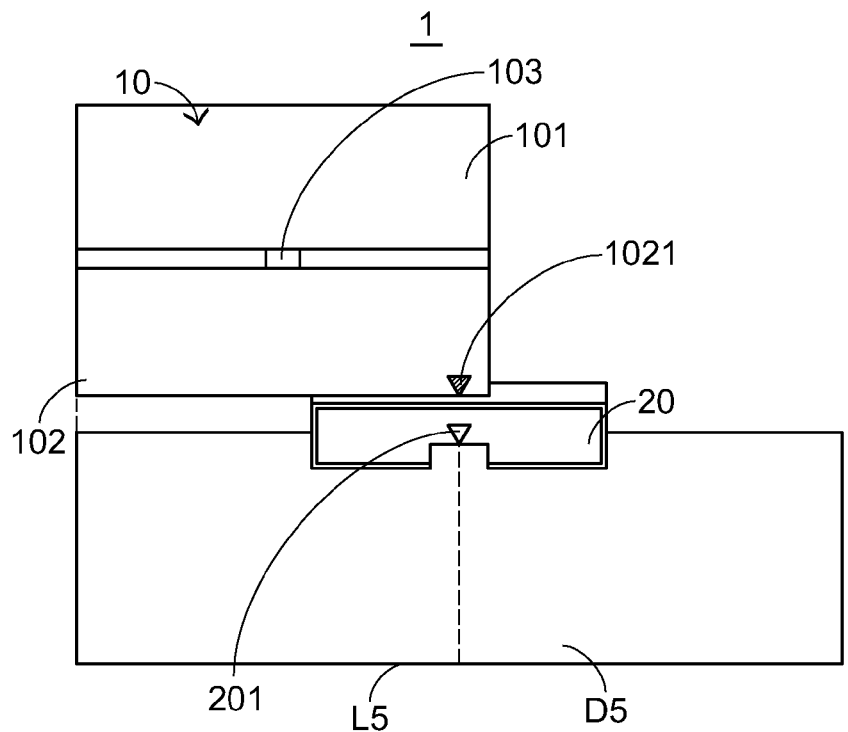
FIGS. 7A and 7B are schematic top views of an imaging system using an image capturing method according to a fifth preferred embodiment of the present invention.
Figure 7B:
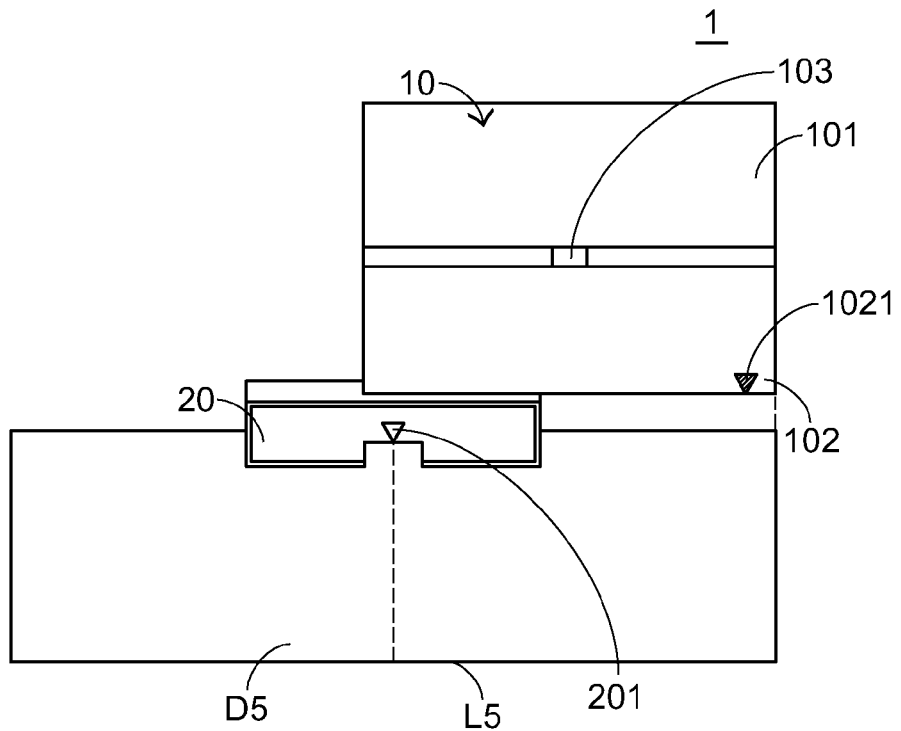

In addition to the symbol marks, the document fixer can be used as a reference point for image combination. FIGS. 7A and 7B are schematic top views of an imaging system using an image capturing method according to a fifth preferred embodiment of the present invention. As shown in FIG. 7, the notebook computer 10 and the document fixer 20 of the imaging system 1 are also disposed on the working desk. The length of a long side L5 of the document D5 is also larger than the length of the keyboard base 102. Likewise, the centerline of the long side L5 of the document D5 needs to be aligned with the fixer middle mark 201 before the document D5 is shot by the image pickup device 103. In this embodiment, only one symbol mark 1021 is formed on the right side of the front edge of the keyboard base 102. As shown in FIG. 7A, the document D5 is fixed by the document fixer 20, and the centerline of the long side L5 of the document D5 is aligned with the fixer middle mark 201. Next, the document fixer 20 is moved until the fixer middle mark 201 is aligned with the symbol mark 1021 and a left short side of the document D5 is aligned with a left edge (or a fore end) of the keyboard base 102. Meanwhile, the image pickup device 103 is aligned with the middle of a first portion of the document D5. Next, the first portion of the document D5 containing the fixer middle mark 201 is shot by the image pickup device 103 for a first time to obtain a first sub-image. The first sub-image includes a first-portion document image area and a first fixer middle mark image area. Next, the document fixer 20 is moved toward the left side until the right short side of the document D5 is aligned with a right edge (or a rear end) of the keyboard base 102, as is shown in FIG. 7B. Meanwhile, the image pickup device 103 is aligned with the middle of a second portion of the document D5. Next, the second portion of the document D5 containing the fixer middle mark 201 is shot by the image pickup device 103 for a second time to obtain a second sub-image. The second sub-image includes a second-portion document image area and a second fixer middle mark image area. For correcting the tilted first and second sub-images, the tilted first and second sub-images are subject to an image processing procedure. The image processing procedure includes a step of performing a trapezoidal correction on the tilted first and second sub-images in order to compensate the tilted distortion. Next, by superposing the first fixer middle mark image area of the first sub-image and the second fixer middle mark image area of the second sub-image, the corrected first and second sub-images of the document D5 are combined together as a complete image of the document D5. After the undesired image areas are cut off, the desired image of the document D5 is retained.

Figure 8A:
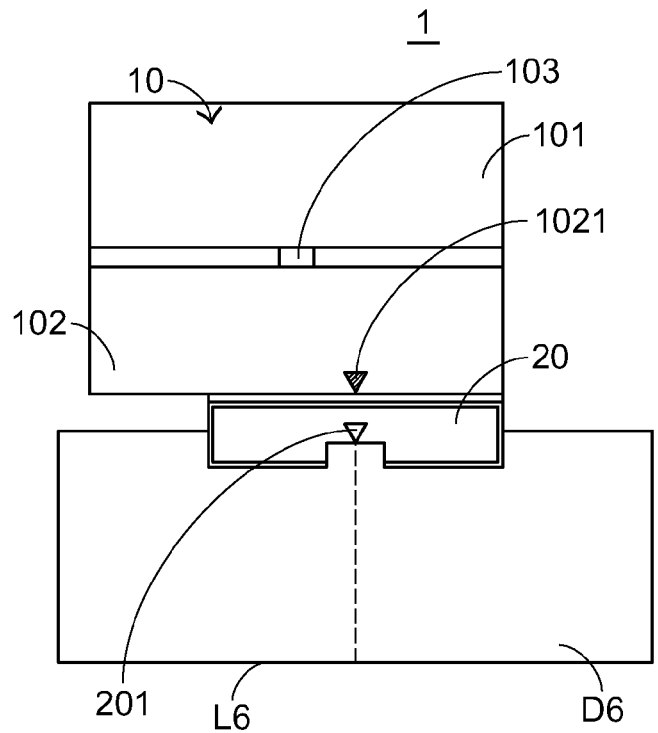
FIGS. 8A and 8B are schematic top views of an imaging system using an image capturing method according to a sixth preferred embodiment of the present invention.
Figure 8B:
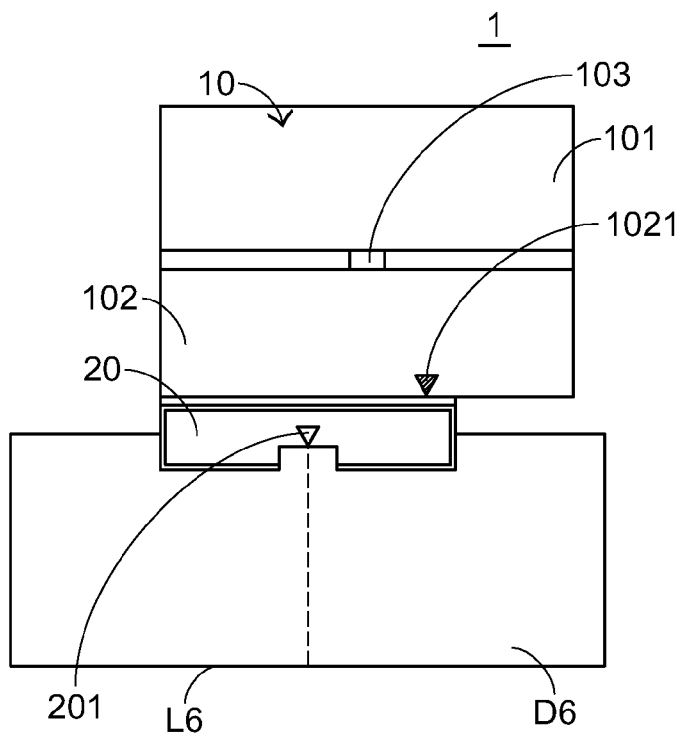

FIGS. 8A and 8B are schematic top views of an imaging system using an image capturing method according to a sixth preferred embodiment of the present invention. In this embodiment, the document fixer 20 is also used as a reference point for image combination. As shown in FIG. 8, the notebook computer 10 and the document fixer 20 of the imaging system 1 are also disposed on the working desk. The length of a long side L6 of the document D6 is also larger than the length of the keyboard base 102. According to the shooting range of the image pickup device 103, the document D6 should be shot for three times in order to acquire the complete image of the document D6. Like the fifth preferred embodiment, only one symbol mark 1021 is formed on the right side of the front edge of the keyboard base 102. As shown in FIG. 8A, the document D6 is fixed by the document fixer 20, and the centerline of the long side L6 of the document D6 is aligned with the fixer middle mark 201. Next, the document fixer 20 is moved until the fixer middle mark 201 is aligned with the symbol mark 1021 and a right edge (or a rear end) of the document fixer 20 is aligned with a right edge (or a rear end) of the keyboard base 102. Meanwhile, the image pickup device 103 is aligned with the middle of a first portion of the document D6. Next, the first portion of the document D6 containing the document fixer 20 is shot by the image pickup device 103 for a first time to obtain a first sub-image. The first sub-image includes a first-portion document image area, a first document fixer fore end image area and a first document fixer rear end image area. After the first sub-image is captured, the document fixer 20 is moved toward the left side until the left edge (or a fore end) of the document fixer 20 is aligned with a left edge (or a fore end) of the keyboard base 102, as is shown in FIG. 8B. Meanwhile, the image pickup device 103 is aligned with the middle of a second portion of the document D6. Next, the second portion of the document D6 containing the fixer middle mark 201 is shot by the image pickup device 103 for a second time to obtain a second sub-image. The second sub-image includes a second-portion document image area, a second document fixer fore end image area and a second document fixer rear end image area. For correcting the tilted first and second sub-images, the tilted first and second sub-images are subject to an image processing procedure. The image processing procedure includes a step of performing a trapezoidal correction on the tilted first and second sub-images in order to compensate the tilted distortion. Next, by superposing the first document fixer fore end image area of the first sub-image and the second document fixer fore end image area of the second sub-image, the corrected first and second sub-images of the document D6 are combined together as a complete image of the document D6. After the undesired image areas are cut off, the desired image of the document D6 is retained.

In the fifth and sixth preferred embodiments, the document fixer is also used as a reference point for image combination. In comparison, the fixer middle mark of the document fixer is used as the reference point in the fifth embodiment but the fore and rear ends of the document fixer is used as the reference point in the sixth embodiment.

Figure 9A:
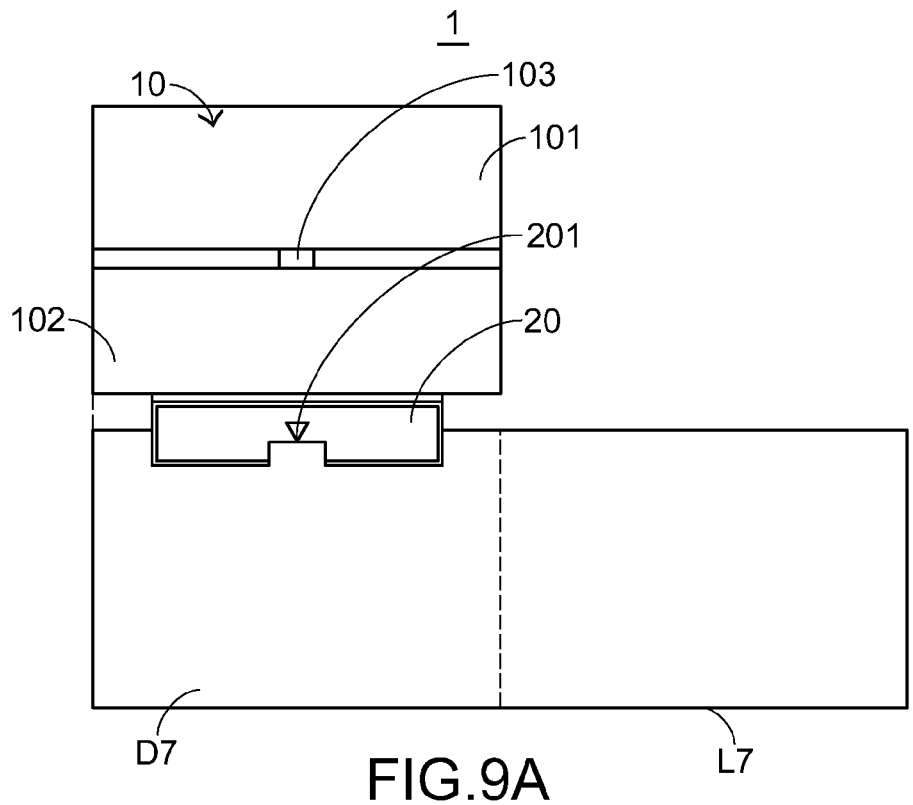
FIGS. 9A and 9B are schematic top views of an imaging system using an image capturing method according to a seventh preferred embodiment of the present invention.
Figure 9B:
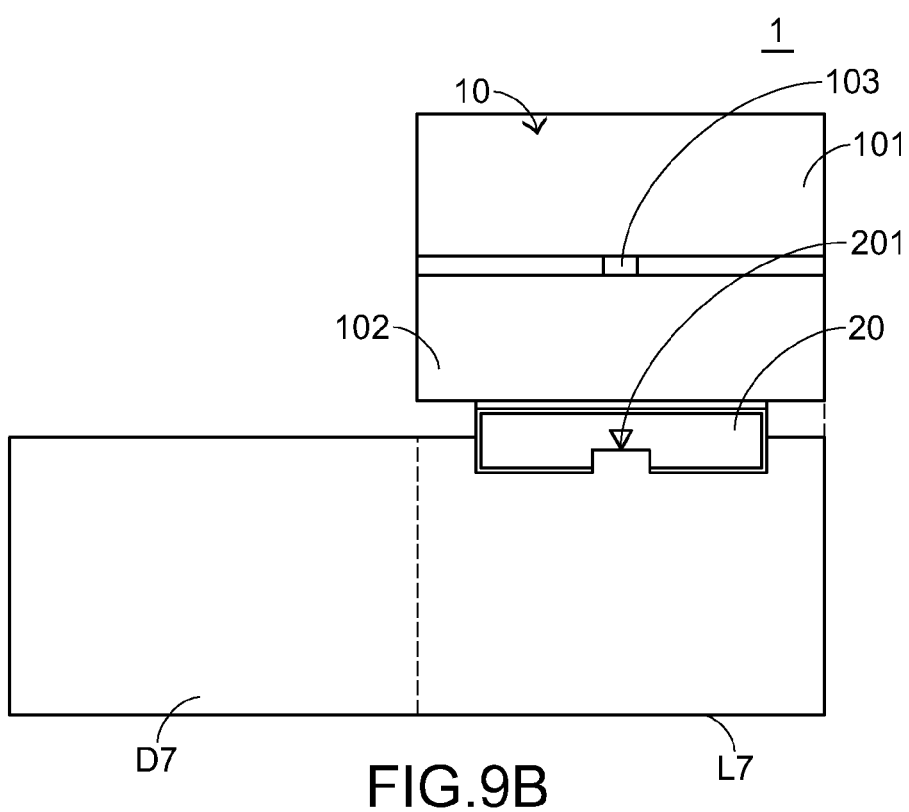

Moreover, the fore or rear end of the keyboard base 102 can be also used a reference point for image combination. FIGS. 9A and 9B are schematic top views of an imaging system using an image capturing method according to a seventh preferred embodiment of the present invention. As shown in FIG. 9, the notebook computer 10 and the document fixer 20 of the imaging system 1 are also disposed on the working desk. The length of a long side L7 of the document D7 is twice as long as the length of the keyboard base 102. In this embodiment, no symbol mark is formed on the front edge of the keyboard base 102. The document D7 is fixed by the document fixer 20 and the document fixer 20 is sustained against the front edge of the keyboard base 102. The horizontal location of the document fixer 20 relative to the keyboard base 102 is not restricted. On the other hand, the relative location between the document D7 and the keyboard base 102 is used as a reference point for image combination. As shown in FIG. 9A, a fore end (a left short side) of a first portion of the document D7 is aligned with a fore end (a left side) of the supporter base 102 and a rear end of the first portion of the document is aligned with a rear end (a right side) of the supporter base 102. Meanwhile, the image pickup device 103 is aligned with the middle of a first portion of the document D7. Next, the first portion of the document D7 containing the fixer middle mark 201 is shot by the image pickup device 103 for a first time to obtain a first sub-image. The first sub-image includes a first-portion document image area, a first supporter base fore end image area and a first supporter base rear end image area. After the first sub-image is captured, the document D7 is also fixed by the document fixer 20. Whereas, a fore end of a second portion of the document D7 is aligned with the fore end of the supporter base 102 and a rear end of the second portion of the document D7 is aligned with a rear end of the supporter base 102, as is shown in FIG. 9B. Meanwhile, the image pickup device 103 is aligned with the middle of a second portion of the document D7. Next, the second portion of the document D7 containing the fixer middle mark 201 is shot by the image pickup device 103 for a second time to obtain a second sub-image. The second sub-image a second-portion document image area, a second supporter base fore end image area and a second supporter base rear end image area. For correcting the tilted first and second sub-images, the tilted first and second sub-images are subject to an image processing procedure. The image processing procedure includes a step of performing a trapezoidal correction on the tilted first and second sub-images in order to compensate the tilted distortion. Next, by superposing the first supporter base rear end image area of the first sub-image and the second supporter base fore end image area of the second sub-image, the corrected first and second sub-images of the document D7 are combined together as a complete image of the document D7.

From the above description, since the document to be shot is fixed by a document fixer and the document fixer is sustained against the front edge of a base of an image pickup device supporter, the document fixer can be horizontally moved on the working plane and the document is no loner aslant during movement of the document. After multiple sub-images of different portions of the document are captured by the image pickup device, these sub-images are subject to an image processing procedure to compensate the tilted distortion. These sub-images are then combined as a complete image. According to the present invention, the relative location between the document fixer and the image pickup device supporter or the relative location between the document and the image pickup device supporter can facilitate the image pickup device to align with various sizes of documents so as to capture the images of the documents. Moreover, the symbol marks, the fixer middle mark, the document fixer fore end, the document fixer rear end, the supporter base fore end or the supporter base rear end can be used as a reference point for facilitate combining the sub-images as the complete image. Accordingly, by using the method of the present invention, a sharp image with slight or no distortion is acquired.

In the above embodiments, the image pickup device supporter of the present invention is illustrated by referring to a notebook computer. Nevertheless, the image pickup device supporter may be a rigid frame having a main body and a supporter base. Since there is usually an included angle between the main body and the supporter base, the image pickup device mounted on the image pickup device supporter is not parallel with the document. It is preferred that the notebook computer is used as the image pickup device supporter because the notebook computer us very popular. The image capturing method of the present invention is user-friendly and convenient.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of capturing an image of a document by using an image pickup device, said method comprising steps of:
    providing an image pickup device supporter having a supporter base, wherein said image pickup device is disposed on said image pickup device supporter, and a first symbol mark is formed on a front edge of a supporter base of said image pickup device supporter;
    providing a document fixer having a fixer middle mark on the middle of said document fixer;
    fixing said document by said document fixer, wherein a centerline of a long edge of said document is aligned with said fixer middle mark;
    moving said document fixer according to a size of said document until said fixer middle mark is aligned with said first symbol mark;
    capturing said image of said document by said image pickup device; and
    performing an image processing procedure on said image.

2. The method according to claim 1 wherein if the length of said long edge of said document is smaller than the length of said document fixer, said first symbol mark is formed on the middle and front edge of said supporter base, so that said image pickup device, said first symbol mark and said fixer middle mark and said centerline of said long edge of said document are arranged along the same line.

3. The method according to claim 2 wherein a fixer lateral mark is further formed on a side of said document fixer, and said fixer lateral mark is aligned with a short side of said document, so that said image pickup device is aligned with said centerline of said long edge of said document for capturing said image of said document.

4. The method according to claim 3 wherein said image processing procedure includes a trapezoidal correction and removal of undesired surrounding image area.

5. The method according to claim 1 wherein if the length of said long edge of said document is larger than the length of said document fixer but smaller than said supporter base, said first symbol mark is formed on the middle and front edge of said supporter base, so that said image pickup device, said first symbol mark and said fixer middle mark and said centerline of said long edge of said document are arranged along the same line.

6. The method according to claim 5 wherein a second symbol mark is further formed on a side of said front edge of said supporter base, and said second symbol mark is aligned with a short side of said document, so that said image pickup device is aligned with said centerline of said long edge of said document for capturing said image of said document.

7. The method according to claim 6 wherein said image processing procedure includes a trapezoidal correction and removal of undesired surrounding image area.

8. The method according to claim 1 wherein if the length of said long edge of said document is larger than the length of said supporter base, a document middle mark is further formed on a first side of said front edge of said supporter base, wherein said fixer middle mark is aligned with said document middle mark and a short side of said document is aligned with a lateral edge of said keyboard base such that said centerline of said long edge of said document is aligned with said fixer middle mark, and said first symbol mark is formed on said first side of said front edge of said supporter base such that said image pickup device is aligned with the middle of a first portion of said document for capturing a first sub-image of said first portion.

9. The method according to claim 8 wherein a second symbol mark is further formed on a second side of said front edge of said supporter base, wherein the distance between said first symbol mark and a rear end of said supporter base is equal to the distance between said second symbol mark and a fore end of said supporter base.

10. The method according to claim 9 wherein after said first sub-image of said document is captured by said image pickup device, said document fixer is moved until said fixer middle mark is aligned with said second symbol mark and said image pickup device is aligned with the middle of a second portion of said document for capturing a second sub-image of said second portion.

11. The method according to claim 10 wherein said image processing procedure is carried out by steps of:
    performing a trapezoidal correction on said first and second sub-images;
    combining said corrected first and second sub-images as a complete image; and
    removing undesired surrounding image area from said complete image.

12. The method according to claim 11 wherein said first sub-image includes a first-portion document image area and a symbol mark image area, said second sub-image includes a second-portion document image area and a second symbol mark image area, and said first and second sub-images are combined as said complete image by superposing said first symbol mark image area of said first sub-image and said second symbol mark image area of said second sub-image.

13. The method according to claim 8 wherein a second symbol mark is further formed on the middle of said front edge of said supporter base and a third symbol mark is further formed on a second side of said front edge of said supporter base, wherein the distance between said first symbol mark and a rear end of said supporter base is equal to the distance between said third symbol mark and a fore end of said supporter base.

14. The method according to claim 13 wherein after said first sub-image of said document is captured by said image pickup device, said document fixer is moved until said fixer middle mark is aligned with said second symbol mark and said image pickup device is aligned with the middle of a second portion of said document for capturing a second sub-image of said second portion.

15. The method according to claim 14 after said second sub-image of said document is captured by said image pickup device, said document fixer is moved until said fixer middle mark is aligned with said third symbol mark and said image pickup device is aligned with the middle of a third portion of said document for capturing a third sub-image of said third portion.

16. The method according to claim 15 wherein said image processing procedure is carried out by steps of:
    performing a trapezoidal correction on said first, second and third sub-images;
    combining said corrected first, second and third sub-images as a complete image; and
    removing undesired surrounding image area from said complete image.

17. The method according to claim 16 wherein said first sub-image includes a first-portion document image area and a symbol mark image area, said second sub-image includes a second-portion document image area and a second symbol mark image area, said third sub-image includes a third-portion document image area and a third symbol mark image area, and said first, second and third sub-images are combined as said complete image by superposing said first symbol mark image area of said first sub-image and said second symbol mark image area of said second sub-image and superposing said second symbol mark image area of said second sub-image and said third symbol mark image area of said third sub-image.

18. The method according to claim 1 wherein said first symbol mark is formed on a first side of said front edge of said supporter base, said fixer middle mark is aligned with said document middle mark, and a first short side of said document is aligned with a fore end of said keyboard base such that said image pickup device is aligned with the middle of a first portion of said document for capturing a first sub-image of said first portion.

19. The method according to claim 18 wherein after said first sub-image of said document is captured by said image pickup device, said document fixer is moved until a second short side of said document is aligned with a rear end of said keyboard base and said image pickup device is aligned with the middle of a second portion of said document for capturing a second sub-image of said second portion.

20. The method according to claim 19 wherein said image processing procedure is carried out by steps of:
performing a trapezoidal correction on said first and second sub-images;
combining said corrected first and second sub-images as a complete image; and
removing undesired surrounding image area from said complete image.

21. The method according to claim 20 wherein said first sub-image includes a first-portion document image area and a first fixer middle mark image area, said second sub-image includes a second-portion document image area and a second fixer middle mark image area, and said first and second sub-images are combined as said complete image by superposing said first fixer middle mark image area of said first sub-image and said second fixer middle mark image area of said second sub-image.

22. The method according to claim 1 wherein said first symbol mark is formed on a first side of said front edge of said supporter base, said fixer middle mark is aligned with said document middle mark, and a rear end of said document fixer is aligned with a rear end of said keyboard base such that said image pickup device is aligned with the middle of a first portion of said document for capturing a first sub-image of said first portion.

23. The method according to claim 22 wherein after said first sub-image of said document is captured by said image pickup device, said document fixer is moved until a fore end of said document fixer is aligned with a fore end of said keyboard base and said image pickup device is aligned with the middle of a second portion of said document for capturing a second sub-image of said second portion.

24. The method according to claim 23 wherein said image processing procedure is carried out by steps of:
performing a trapezoidal correction on said first and second sub-images;
combining said corrected first and second sub-images as a complete image; and
removing undesired surrounding image area from said complete image.

25. The method according to claim 24 wherein said first sub-image includes a first-portion document image area, a first document fixer fore end image area and a first document fixer rear end image area, said second sub-image includes a second-portion document image area, a second document fixer fore end image area and a second document fixer rear end image area, and said first and second sub-images are combined as said complete image by superposing said first document fixer fore end image area of said first sub-image and said second document fixer fore end image area of said second sub-image.

26. The method according to claim 1 wherein said image pickup device is a camera or a web camera.

27. The method according to claim 1 wherein said image pickup device supporter is a rigid frame or a notebook computer comprising a main body and said supporter base, and there is an included angle between said main body and said supporter base.

28. A method of capturing an image of a document by using an image pickup device, said method comprising steps of:
providing an image pickup device supporter having a supporter base, wherein said image pickup device is disposed on said image pickup device supporter;
providing a document fixer;
fixing said document by said document fixer, wherein a fore end of a first portion of said document is aligned with a fore end of said supporter base and a rear end of said first portion of said document is aligned with a rear end of said supporter base;
capturing a first sub-image of said first portion of said document by said image pickup device, wherein said first sub-image a first-portion document image area, a first supporter base fore end image area and a first supporter base rear end image area;
fixing said document by said document fixer, wherein a fore end of a second portion of said document is aligned with said fore end of said supporter base and a rear end of said second portion of said document is aligned with a rear end of said supporter base;
capturing a second sub-image of said second portion of said document by said image pickup device, wherein said second sub-image a second-portion document image area, a second supporter base fore end image area and a second supporter base rear end image area;
performing a trapezoidal correction on said first and second sub-images; and
combining said corrected first and second sub-images as a complete image by superposing said first supporter base rear end image area of said first sub-image and said second supporter base fore end image area of said second sub-image.

29. The method according to claim 28 further comprising a step of removing undesired surrounding image area from said complete image.

30. The method according to claim 28 wherein the length of said long side of said document is twice as long as the length of said supporter base.

31. The method according to claim 28 wherein said image pickup device is a camera or a web camera.

32. The method according to claim 28 wherein said image pickup device supporter is a rigid frame or a notebook computer comprising a main body and said supporter base, and there is an included angle between said main body and said supporter base.

* * * * *